(12) United States Patent
Young et al.

(10) Patent No.: US 11,130,176 B2
(45) Date of Patent: Sep. 28, 2021

(54) TECHNIQUES FOR PRODUCING SMA MATERIALS AND POWDERS

(71) Applicant: University of North Texas, Denton, TX (US)

(72) Inventors: Marcus Lynn Young, Oak Point, TX (US); Yoav Snirs, Plano, TX (US)

(73) Assignee: University of North Texas, Denton, TX (US)

(*) Notice: Subject to any disclaimer, the term of this patent is extended or adjusted under 35 U.S.C. 154(b) by 271 days.

(21) Appl. No.: 16/335,062

(22) PCT Filed: Sep. 29, 2017

(86) PCT No.: PCT/US2017/054470
§ 371 (c)(1),
(2) Date: Mar. 20, 2019

(87) PCT Pub. No.: WO2018/106329
PCT Pub. Date: Jun. 14, 2018

(65) Prior Publication Data
US 2020/0009661 A1    Jan. 9, 2020

Related U.S. Application Data

(60) Provisional application No. 62/401,828, filed on Sep. 29, 2016.

(51) Int. Cl.
*B22F 5/08*     (2006.01)
*B22F 9/04*     (2006.01)
(Continued)

(52) U.S. Cl.
CPC .......... *B22F 9/04* (2013.01); *B22F 5/085* (2013.01); *B33Y 70/00* (2014.12); *C22C 19/03* (2013.01); *B22F 2301/15* (2013.01)

(58) Field of Classification Search
CPC ................. B22F 9/04; C22C 19/03
(Continued)

(56) References Cited

U.S. PATENT DOCUMENTS

2018/0142377 A1* 5/2018 Gao .................. C30B 15/34

OTHER PUBLICATIONS

Shao et al. "Preparing TiNiNb Shape Memory Alloy Powders by Hydriding-Dehydriding Process" Smart Materials and Structures, vol. 25, No. 7 (Jun. 2016): 6 pages.
(Continued)

*Primary Examiner* — Coris Fung
*Assistant Examiner* — Danielle Carda
(74) *Attorney, Agent, or Firm* — Norton Rose Fulbright US LLP

(57) ABSTRACT

Embodiments of the present disclosure provide improved techniques for creating SMA materials and SMA powders. SMA materials and powders formed may be used to form porous structures suitable for applications such as biomaterials, damping applications, actuators, and/or sensors. Embodiments for performing hydriding and dehydriding of SMA wires at low pressure and low temperature are provided. Methods may be used to produce a shape memory alloy (SMA) powder. Such methods may include hydriding a length SMA wire under low pressure for a period of time to produce a length of hydrided SMA wire, crushing the length of hydrided SMA wire to form a hydrided SMA powder, and dehydriding the hydrided SMA powder to form a dehydrided SMA powder.

11 Claims, 11 Drawing Sheets

(51) Int. Cl.
　　　*B33Y 70/00*　　　(2020.01)
　　　*C22C 19/03*　　　(2006.01)
(58) Field of Classification Search
　　　USPC .......................................................... 148/508
　　　See application file for complete search history.

(56) References Cited

OTHER PUBLICATIONS

Mineta et al. "Batch Fabricated Flat Meandering Shape Memory Alloy Actuator for Active Catheter" Sensors and Actuators A: Physical, vol. 88, No. 12 (Feb. 2001): 9 pages.

Yokoyama et al. "Delayed Fracture of Ni—Ti Superelastic Alloys in Acidic and Neutral Fluoride Solutions" Journal of Biomedical Materials Research Part A, vol. 69, No. 1 (Apr. 2004): 9 pages.

Schmidt et al. "Hydrogen Solubility and Diffusion in the Shape-Memory Alloy NiTi" Journal of Physics: Condensed Matter, vol. 1, No. 14 (1989): 10 pages.

Snir et al. "Effects of Hydrogen Charging on the Phase Transformation of Martensitic NiTi Shape Memory Alloy Wires" Shape Memory and Superelasticity, vol. 3, No. 4 (2017): 14 pages.

International Search Report and Written Opinion issued for PCT Application No. PCT/US2017/054470, dated Jul. 31, 2018, 13 pages.

\* cited by examiner

TECHNIQUES FOR PRODUCING SMA MATERIALS AND POWDERS

CROSS-REFERENCE TO RELATED APPLICATIONS

This application is a national phase application under 35 U.S.C. § 371 of International Application No. PCT/US2017/054470 filed Sep. 29, 2017, which claims priority to U.S. Provisional Patent Application No. 62/401,828 filed Sep. 29, 2016. The entire contents of each of the above-referenced disclosures is specifically incorporated by reference herein without disclaimer.

TECHNICAL FIELD

The present application is directed to shape memory alloys, and more particular to techniques for processing shape memory alloys (SMAs).

BACKGROUND

SMAs are of particular interest across many different fields due to their unique shape memory effect or pseudoelasticity. SMA components and materials can be formed using a mixture of metals, such as a mixture of nickel and titanium metals, or may be formed from a mixture of powders (e.g., using arc-melting, induction melting, combustion synthesis, hot isostatic pressing (HIP) or metal injection molding (MIM) techniques). SMAs find particular utility for applications involving additive manufacturing techniques, where, for example, SMA metal powders can be used to create complex three-dimensional structures and/or unique compositionally graded structures that would be costly, difficult, or impossible to produce by other traditional manufacturing methods. However, traditional manufacturing methods of metal powders involve high temperatures utilize corrosive and/or oxidative environments during the manufacturing processes which often result in dangerous conditions and/or contamination and degradation of functional SMA properties. For example, the traditional methods of manufacturing metal powders involve use of hydrogen gas at high temperature and pressures creating extremely dangerous and costly manufacturing environments. Additionally, these high temperatures and pressures degrade the pseudoelasticity/superelasticity and the shape memory effect. Additionally, machining difficulties experienced with some SMAs, such as nickel-titanium (NiTi) SMAs due to resistance to deformation highlight the need for improved techniques for manufacturing and powder processing techniques.

SUMMARY

Powder metallurgy and metal powder production, such as the process to develop powder from NiTi SMAs have a high potential to be useful in additive manufacturing. Embodiments of the present disclosure provide improved techniques for creating SMA materials and SMA powders. SMA materials and powders formed according to embodiments may be used to form porous structures suitable for applications such as biomaterials, damping applications, actuators, and/or sensors. For example, porous SMA foams (e.g., NiTi foams) may be used in bone implants due to their low density, large amounts of surface area and high permeability. Such foams also exhibit excellent energy absorption characteristics and may prove to be a promising material for many biomedical applications. Traditional cast implants have a tendency to cause stress-shielding and can weaken bones locally. This effect may be avoided in NiTi SMA implants which may homogenously distribute stress. These NiTi SMA implants may provide porous bone substitutes and may be formed using metallic SMA powders.

The techniques for producing SMA powders suitable for such applications in accordance with embodiments of the present disclosure may result in improved performance of NiTi SMA implants. For example, existing powder metallurgy methods are limited because of the NiTi SMA's high melting point. Common methods of powder processing like self-propagating high temperature synthesis (SHS), spark plasma sintering (SPS), as well as conventional sintering, cause undesirable areas of partial powder densification and areas of non-equiatomic nickel titanium phases. Embodiments of the present disclosure provide techniques for producing pre-alloyed NiTi SMA powders, for example, that may exhibit a reduced presence of these undesirable phases which form due to low enthalpy of formation in porous NiTi SMA components. The ability to make improved pre-alloyed NiTi SMA powders using embodiments of the present disclosure that are suitable for porous components that may be used in biomedical implant devices and in the automotive and aerospace industries, for example, may significantly improve the quality of life for those who receive such implants, as well as provide improvements to global automotive and aerospace design, as described in more detail below. Additionally, SMA powders and materials formed according to embodiments of the present disclosure may exhibit improved mechanical properties because the disclosed embodiments of techniques for producing SMA powders and materials may reduce the amount of impurities (e.g., oxygen and carbon) introduced during the manufacturing of the SMA powders and materials.

In an embodiment, a method for hydriding and dehydriding a metal object is disclosed and includes providing a metal object, and hydriding the metal object for a period of time. According to embodiments, the hydriding may be performed at a pressure that is below a threshold pressure. In an embodiment, the threshold pressure may be between approximately 1 bar and 100 bar. In an embodiment, the hydriding may further be performed at low temperature. In an embodiment, a "low temperature" for the hydriding may be a temperature between substantially 40° C. and 500° C. In an embodiment, the hydriding of the metal object at low temperature and low pressure may be performed by placing the metal object into a liquid solution, such as an acid. The, method may include monitoring, during the hydriding, a temperature of the liquid solution, and controlling, during the hydriding, the temperature of the liquid solution during the hydriding. The controlling may maintain the temperature of the liquid solution within a threshold tolerance of a target hydriding temperature during the period of time (e.g., the period of time the metal object is hydrided). The method further includes dehydriding the metal object. The dehydriding may include heating the metal object for a second period of time. In an embodiment, the metal object may be heated in a vacuum furnace under an Argon environment. In an embodiment, the metal object may be heated at a temperature between approximately 650° C. and 1100° C., the second period of time may be between approximately 5 minutes and 72 hours. As explained in more detail below, the exemplary methods and its variants, provide improved techniques for processing SMA metals to form SMA powders that enable fine control over the size of SMA powder particles. Additionally, the exemplary method and its variants, as described in more detail below, provide a safer technique for manufacturing SMA powders and SMA springs/actuators (e.g., due to its low pressure and low temperature hydriding).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
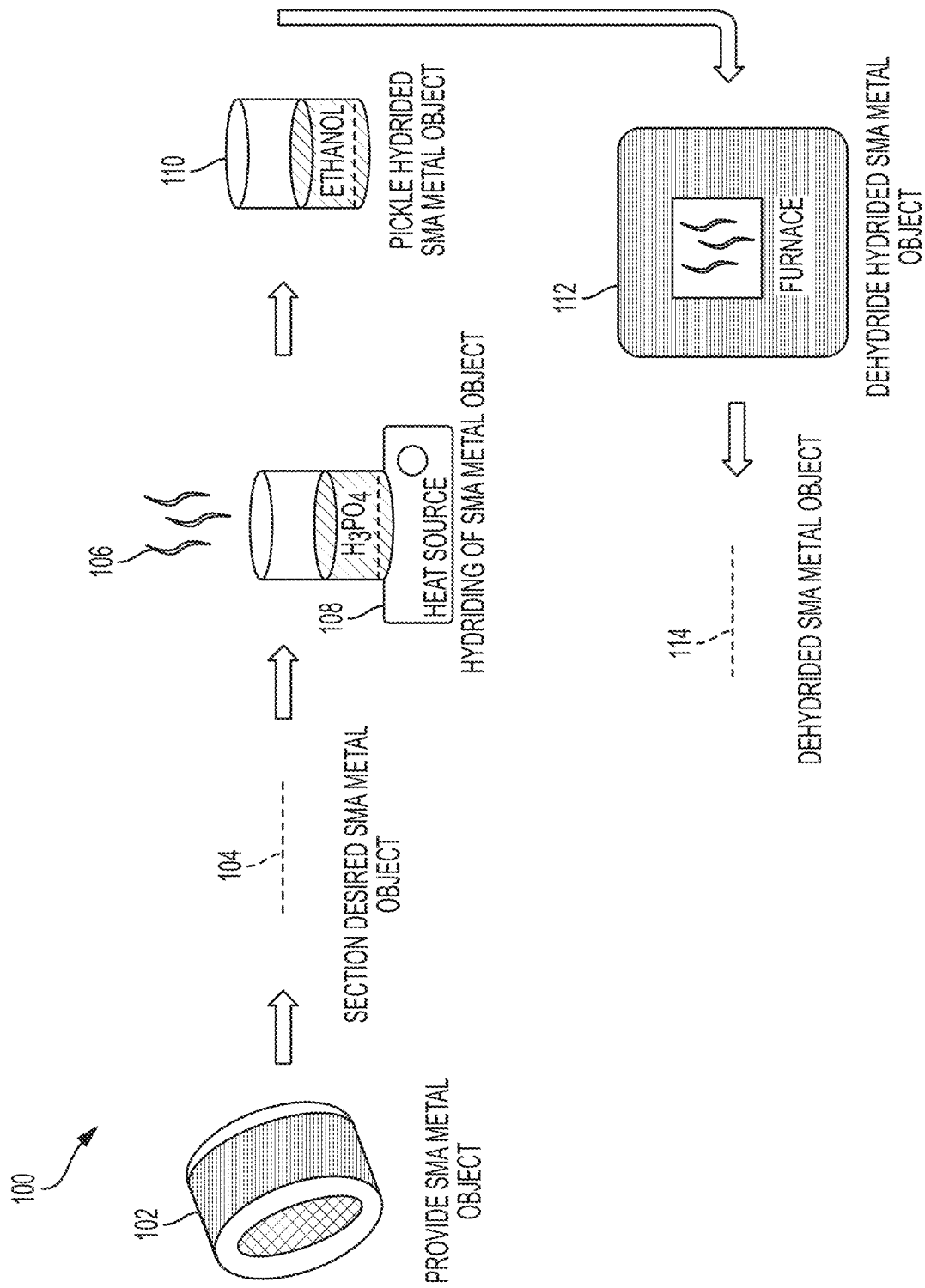
FIG. 1 is a diagram illustrating an exemplary method for hydriding a metal object according to an embodiment of the present disclosure.

Referring to FIG. 1, an exemplary method for hydriding a metal object according to an embodiment of the present disclosure is shown as method 100. As described in more detail below, method 100 may be utilized to produce shape memory alloy (SMA) powders, which can be utilized to embed sensors into various components or items, or to produce SMA springs which may be utilized for various purposes, such as to serve as an actuator. At 102, method 100 includes providing a metal object. In an embodiment, the metal object may be an SMA metal object. For example, the metal object may be a length of SMA wire (e.g., a length of wire comprising a nickel-titanium (NiTi) alloy, such as a length of martensitic $Ni_{49.5}Ti_{50.5}$ SMA wire, or another type of SMA) or a length of magnetic SMA wire (e.g., a length of magnetic SMA wire comprising a nickel-manganese-gallium alloy, such as a length of $Ni_2MnGa$ magnetic SMA wire).

At 104, method 100 includes sectioning a desired dimension of the metal object. In an embodiment, sectioning the desired dimension of the metal object may include cutting a length of SMA wire or a length of magnetic SMA wire. In an embodiment, the desired dimension of the metal object may dependent upon the particular application for which the metal object is to be used. For example, when the metal object is an SMA or magnetic SMA wire is configured to operate as a spring or actuator, the metal object (e.g., the wire) may be sectioned to a desired length for the spring or actuator. In addition to determining a length for the metal object, in some embodiments, a diameter or other dimension of the metal object may be determined and/or sectioned. For example, a diameter of the spring or actuator may be determined by selecting a wire having a desired diameter. As another example, the diameter of the wire may be selected to constrain a size of particles during production of SMA powders, as described in more detail below.

At 106, method 100 includes hydriding the metal object for a period of time. In contrast to conventional hydriding techniques which are performed by exposing a metal to hydrogen gas at high pressures (e.g., pressures of 150 bar or greater) and high temperatures (e.g., temperatures of 550° C. or greater), the hydriding performed at 106 may be performed at low pressure and low temperatures. For example, the hydriding may be performed at a pressure that is below a threshold pressure and at temperatures that are below a threshold temperature. In an embodiment, the threshold pressure is below 150 bar and the threshold temperature is below 550° C. In an particular embodiment, the threshold pressure is below 100 bar and the threshold temperature is below 500° C. In another particular embodiment, the threshold pressure is between 1 bar and 100 bar and the threshold temperature between 40° C. and 500° C. In still another particular embodiment, the threshold pressure is approximately atmospheric pressure (e.g., 1 bar) and the threshold temperature is approximately 65° C. Performing the hydriding at a pressure that is below the threshold pressure and at a temperature that is below the threshold temperature may provide significant improvement to the safety of the hydriding process. For example, the high pressure hydrogen gas and high temperatures utilized in some conventional hydriding techniques create safety concerns (e.g., because hydrogen is highly flammable). Embodiments of method 100, provide improved safety by performing the hydriding at low pressure and low temperatures.

To facilitate the low pressure and low temperature hydriding according to embodiments, the hydriding may be performed by placing the metal object (e.g., the SMA wire or magnetic SMA wire) in a liquid solution. In an embodiment, the liquid solution may be an acid. In an embodiment, the acid may be comprised of phosphoric acid ($H_3PO_4$), another type of acid (e.g., $H_2SO_4$, $HC_2H_3O_2$, $H_3BO_3$, $HNO_3$, diluted HCl, diluted HF, etc.), or an electrochemical cell suitable for interacting with the particular SMA. In an embodiment, the hydriding, at 106, may comprise monitoring a temperature of the liquid solution, and controlling, during the hydriding, the temperature of the liquid solution during the hydriding. The temperature may be controlled to maintain the temperature of the liquid solution (e.g., the acid) within a threshold tolerance of a target hydriding temperature during the period of time. In an embodiment, the target hydriding temperature and/or the period of time that the hydriding is performed may be selected based on one or more characteristics of the metal object. For example, characteristics affecting the period of time that the hydriding is performed and/or the target hydriding temperature may include a desired width of the spiral groove to be formed on the SMA, a size of the spiral groove, and/or a size of the SMA powder, Additionally, characteristics associated with the alloy composition of the SMA may be used to determine the target hydriding temperature and duration, as well as the PH level resulting from the specific acid/electrolyte used during the hydriding. In an embodiment, the one or more characteristics of the metal object may further include transformation temperatures. For example, SMAs may be hydrided in martensite (e.g., below $M_f$, where $M_f$ is the martensite finish temperature of the SMA) and then heated (e.g., during the dehydriding) to austenite (e.g., above $A_f$, where $A_f$ is the austenite finish temperature of the SMA) to induce phase transformation and spiral cracking of the SMA. The duration of time may be dependent upon how fast the hydriding occurs, where higher temperatures result in faster hydriding (and mass loss) and thus, the hydriding may be performed for a shorter duration at those higher temperatures. In an embodiment, the controlling may be performed by controlling a heat source 108 that may be used to maintain the liquid solution at the target hydriding temperature for the period of time. In an embodiment, one or more sensors may be utilized to monitor the temperature of the liquid solution during the hydriding, and information obtained from the one or more sensors may be utilized to control operation of the heat source 108 to maintain the liquid solution at the target hydriding temperature for the period of time. During the hydriding, at 106, hydrogen in the liquid solution diffuses into the alloy as a solute. Eventually it reaches the solubility limit and starts to form hydrides. Since the concentration of hydrogen is highest at the surface, the formation of hydrides initiates at the surface. As more hydrogen diffuses with increasing time into the alloy, hydrides continue to grow into the bulk.

In an embodiment, after the hydriding is complete, method 100 may include, at 110, cleaning the metal object subsequent to the hydriding. In an embodiment, the cleaning may include pickling the metal object by placing the metal object in an ultrasonic bath subsequent to the hydriding, and then allowing the metal object to dry. In an embodiment, the ultrasonic bath may be comprised of ethanol, another type of alcohol (e.g., methanol), acetone, or another type of cleaner. In an embodiment where the metal object is to be used to manufacture an SMA powder, the hydrided metal object may be crushed after the metal object has been hydrided, pickled, and allowed to dry, as described with reference to FIG. 2. In an embodiment where the metal object is to be used to manufacture an actuator or spring, rather than a powder, the hydrided metal object may be dehydrided after the metal object has been hydrided, pickled, and allowed to dry, rather than crushed, as described with reference to FIG. 3.

At 112, method 100 includes dehydriding the hydrided metal object (e.g., the hydrided length of SMA or magnetic SMA wire). In an embodiment, the dehydriding, at 112, may be performed by heating the hydrided metal object in a vacuum furnace. In an embodiment, the hydrided metal object may be heated in the vacuum furnace under an Argon environment, which may prevent the metal object from undergoing chemical reactions as a result of the heating. The dehydriding (e.g., the heating of the hydrided metal object in the vacuum furnace) may be performed for a period of time (e.g., a dehydriding time). The dehydriding may burn off any hydrogen present and return the metal object to its original state (e.g., all hydrides that formed on the metal object during the hydriding may be removed and the metal object may be returned to substantially the same alloy composition it had prior to the hydriding). In an embodiment, the dehydriding may be performed for a period of time. In an embodiment, the period of time that the dehydriding is performed may be approximately one hour. In some embodiments, the period of time for the dehydriding may be between 5 minutes and 72 hours, depending on a temperature used for the dehydriding. In an embodiment, the dehydriding may include heating the metal object at a temperature of approximately 700° C. In some embodiments, the dehydriding may be performed at a temperature between 650° C. and 1100° C. In an embodiment, the temperature used for the dehydriding may be determined based on a precipitation and melting point of the SMA. When selecting or determining the dehydriding temperature, the temperature should be selected/determined as a temperature that is high enough to homogenize/solutionize the structure of the SMA to binary NiTi (or another structural form depending on the particular alloy composition of the SMA). For example, the temperature used for the dehydriding may be determined as a temperature that is above the precipitation and below the melting point for the SMA. If the selected/determined temperature is too low, precipitation of $Ti_2Ni$ or $Ni_4Ti_3$ in NiTi will occur depending upon the percentage of Ni in the alloy, for example. At lower temperatures it may take a longer amount time for homogenization and diffusion/removal of the hydrogen, and the dehydriding may need to be performed for a longer period of time. Thus, a relationship between the dehydriding time and the target dehydriding temperature may be expressed as: as the dehydriding temperature increases to within a threshold tolerance (e.g., the melting point) the dehydriding time decreases.

As a result of the dehydriding, at 112, a dehydrided metal object may be produced, at 114. In an embodiment, the dehydrided metal object may possess the same or substantially the same SMA properties as the metal object prior to subjecting the metal object to the processes performed by method 100. Thus, for example, and as explained in more detail below, when SMA powders are produced from SMA or magnetic SMA wires according to embodiments (e.g., using the techniques described with reference to FIG. 2, below), the SMA powders may possess the same or substantially the same SMA properties as the metal object prior to subjecting the metal object to the processes performed by method 100. For example, the SMA wire or magnetic SMA wire may possess a directionality SMA property which may be retained by the SMA powders produced using embodiments of the present disclosure. Further, dehydrided SMA and magnetic SMA materials produced according to embodiments may exhibit SMA properties that more closely match the properties of the SMA materials prior to performing method 100 because the methods of embodiments are performed at low temperatures and pressures. In contrast, hydriding and dehydriding techniques that utilize high pressure and temperatures during the hydriding process may lose some of their SMA properties or experience degradation of their SMA properties due to the high temperatures utilized during the hydriding (e.g., the high temperatures degrade the SMA properties embedded in the SMA materials during training). Thus, hydriding and dehydriding processes according to embodiments may result in improved SMA materials, such as powders, springs, and/or actuators.

Figure 2:
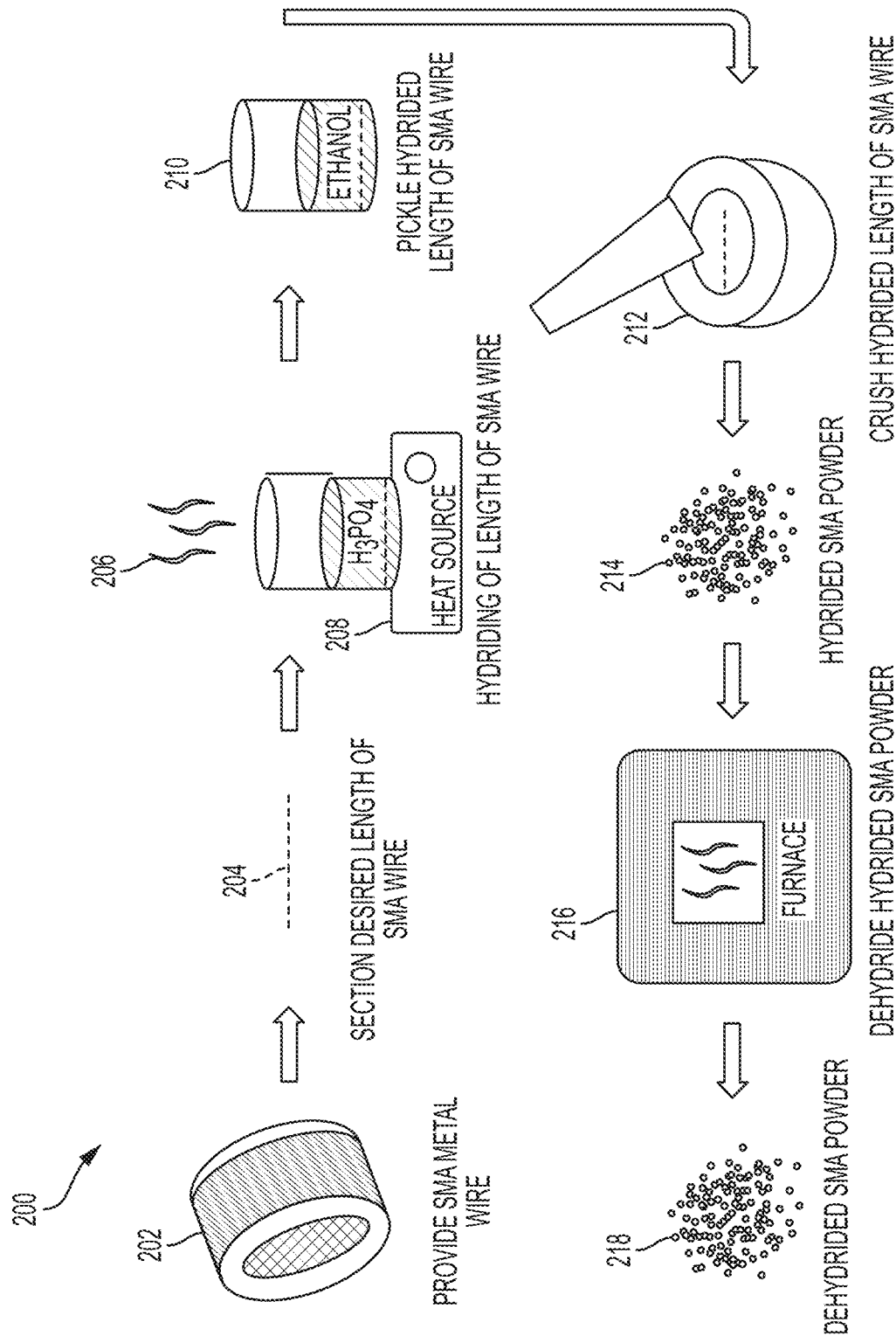
FIG. 2 is a diagram illustrating an exemplary method for producing SMA powders by hydriding a metal object according to an embodiment of the present disclosure.

Referring to FIG. 2, an exemplary method for producing SMA powders by hydriding a metal object according to an embodiment of the present disclosure is shown as method 200. Method 200 may be utilized to produce shape memory alloy (SMA) powders, which can be utilized to embed sensors into various components or items, as described in more detail below. At 202, method 200 includes providing a metal object. In an embodiment, the metal object may be an SMA metal object. For example, the metal object may be a length of SMA wire (e.g., a length of wire comprising a nickel-titanium (NiTi) alloy, such as a length of martensitic $Ni_{49.5}Ti_{50.5}$ SMA wire, or another type of SMA) or a length of magnetic SMA wire (e.g., a length of magnetic SMA wire comprising a nickel-manganese-gallium alloy, such as a length of $Ni_2MnGa$ magnetic SMA wire).

At 204, method 200 includes sectioning a desired dimension of the metal object. In an embodiment, sectioning the desired dimension of the metal object may include cutting a length of SMA wire or a length of magnetic SMA wire. In an embodiment, the desired dimension of the metal object may dependent upon the particular application for which the metal object is to be used. For example, a diameter of the wire may be selected to constrain a size of particles during production of SMA powders, as described in more detail below.

At 206, method 200 includes hydriding the metal object for a period of time. As explained above, in contrast to conventional hydriding techniques which are performed by exposing a metal to hydrogen gas at high pressures (e.g., pressures of 150 bar or greater) and high temperatures (e.g., temperatures of 550° C. or greater), the hydriding performed at 206 may be performed at low pressure and low temperatures. For example, the hydriding may be performed at a pressure that is below a threshold pressure and at temperatures that are below a threshold temperature. In an embodiment, the threshold pressure may be below 150 bar and the threshold temperature may be below 550° C. In an particular embodiment, the threshold pressure may be below 100 bar and the threshold temperature is below 500° C. In another particular embodiment, the threshold pressure is between 1 bar and 100 bar and the threshold temperature may be between 40° C. and 500° C. In still another particular embodiment, the threshold pressure may be approximately atmospheric pressure (e.g., 1 bar) and the threshold temperature may be approximately 65° C. Performing the hydriding at a pressure that is below the threshold pressure and at a temperature that is below the threshold temperature may provide significant improvement to the safety of the hydriding process. For example, the high pressure hydrogen gas and high temperatures utilized in some conventional hydriding techniques create safety concerns (e.g., because hydrogen is highly flammable). Embodiments of method 200 provide improved safety by performing the hydriding at low pressure and low temperatures.

To facilitate the low pressure and low temperature hydriding according to embodiments, the hydriding may be performed by placing the metal object (e.g., the SMA wire or magnetic SMA wire) in a liquid solution. In an embodiment, the liquid solution may be an acid. In an embodiment, the acid may be comprised of phosphoric acid ($H_3PO_4$), another type of acid (e.g., $H_2SO_4$, $HC_2H_3O_2$, $H_3BO_3$, $HNO_3$, diluted HCl, diluted HF, etc.), or an electrochemical cell suitable for interacting with the particular SMA. In an embodiment, the hydriding, at 206, may comprise monitoring a temperature of the liquid solution, and controlling, during the hydriding, the temperature of the liquid solution during the hydriding. The temperature may be controlled to maintain the temperature of the liquid solution (e.g., the acid) within a threshold tolerance of a target hydriding temperature during the period of time. In an embodiment, the target hydriding temperature and/or the period of time that the hydriding is performed may be selected based on one or more characteristics of the metal object. For example, characteristics affecting the period of time that the hydriding is performed and/or the target hydriding temperature may include a desired width of the spiral groove to be formed on the SMA, a size of the spiral groove, and/or a size of the SMA powder, Additionally, characteristics associated with the alloy composition of the SMA may be used to determine the target hydriding temperature and duration, as well as the PH level resulting from the specific acid/electrolyte used during the hydriding. In an embodiment, the one or more characteristics of the metal object may further include transformation temperatures. For example, SMAs may be hydrided in martensite (e.g., below $M_f$, where $M_f$ is the martensite finish temperature of the SMA) and then heated (e.g., during the dehydriding) to austenite (e.g., above $A_f$, where $A_f$ is the austenite finish temperature of the SMA) to induce phase transformation and spiral cracking of the SMA. The duration of time may be dependent upon how fast the hydriding occurs, where higher temperatures result in faster hydriding (and mass loss) and thus, the hydriding may be performed for a shorter duration at those higher temperatures. In an embodiment, the controlling may be performed by controlling a heat source 208 that may be used to maintain the liquid solution at the target hydriding temperature for the period of time. In an embodiment, one or more sensors may be utilized to monitor the temperature of the liquid solution during the hydriding, and information obtained from the one or more sensors may be utilized to control operation of the heat source 208 to maintain the liquid solution at the target hydriding temperature for the period of time. During the hydriding, at 106, hydrogen in the liquid solution diffuses into the alloy as a solute. Eventually it reaches the solubility limit and starts to form hydrides. Since the concentration of hydrogen is highest at the surface, the formation of hydrides initiates at the surface. As more hydrogen diffuses with increasing time into the alloy, hydrides continue to grow into the bulk.

In an embodiment, after the hydriding is complete, method 200 may include, at 210, cleaning the metal object subsequent to the hydriding. In an embodiment, the cleaning may include pickling the metal object by placing the metal object in an ultrasonic bath subsequent to the hydriding, and then allowing the metal object to dry. In an embodiment, the ultrasonic bath may be comprised of ethanol, another type of alcohol (e.g., methanol), acetone, or another type of cleaner. After the metal object has been hydrided, pickled, and allowed to dry, method 200 includes, at 212, crushing the hydrided metal object to form a hydrided SMA powder, at 214. At 216, method 200 includes dehydriding the hydrided SMA powder. In an embodiment, the dehydriding, at 216, may be performed by heating the hydrided SMA powder in a vacuum furnace. In an embodiment, the hydrided SMA powder may be heated in the vacuum furnace under an Argon environment, which may prevent the SMA powder from undergoing chemical reactions as a result of the heating. The dehydriding (e.g., the heating of the hydrided SMA powder in the vacuum furnace) may be performed for a period of time (e.g., a dehydriding time). The dehydriding may burn off any hydrogen present and return the SMA powder to its original state (e.g., all hydrides that present in the SMA powder during the hydriding may be removed and the composition of the SMA powder may be returned to substantially the same alloy composition that the metal object had prior to the hydriding). In an embodiment, the dehydriding may be performed for a period of time. In some embodiments, the period of time for the dehydriding may be between 5 minutes and 72 hours, depending on a temperature used for the dehydriding. In an embodiment, the period of time that the dehydriding is performed may be approximately one hour. In an embodiment, the dehydriding may include heating the SMA powder at a temperature of approximately 700° C. In some embodiments, the dehydriding may be performed at a temperature between 650° C. and 1100° C. In an embodiment, the temperature used for the dehydriding may be determined based on a precipitation and melting point of the SMA. When selecting or determining the dehydriding temperature, the temperature should be selected/determined as a temperature that is high enough to homogenize/solutionize the structure of the SMA to binary NiTi (or another structural form depending on the particular alloy composition of the SMA). For example, the temperature used for the dehydriding may be determined as a temperature that is above the precipitation and below the melting point for the SMA. If the selected/determined temperature is too low, precipitation of $Ti_2Ni$ or $Ni_4Ti_3$ will occur depending upon the percentage of Ni in the alloy, for example. At lower temperatures it may take a longer amount of time for homogenization and diffusion/removal of the hydrogen, and the dehydriding may need to be performed for a longer period of time. Thus, a relationship between the dehydriding time and the target dehydriding temperature may be expressed as: as the dehydriding temperature increases to within a threshold tolerance (e.g., the melting point) the dehydriding time decreases.

As a result of the dehydriding, a dehydrided SMA powder may be produced, at 218. In an embodiment, the dehydrided SMA powder may possess the same or substantially the same SMA properties as the metal object prior to subjecting the metal object to the processes performed by method 200. Thus, for example, the dehydrided SMA powders produced at 218 may possess the same or substantially the same SMA properties as the metal object prior to subjecting the metal object to the processes performed by method 200. For example, the metal object (e.g., the SMA wire or magnetic SMA wire) may possess a directionality SMA property which may be retained by the SMA powder produced at 218 using embodiments of the present disclosure. Further, dehydrided SMA and magnetic SMA materials, such as the SMA powder 218, produced according to embodiments may exhibit SMA properties that more closely match the properties of the SMA materials prior to performing method 200 because methods of embodiments are performed at low temperatures and pressures. In contrast, hydriding and dehydriding techniques that utilize high pressure and temperatures during the hydriding process may lose some of their SMA properties or experience degradation of their SMA properties due to the high temperatures utilized during the hydriding (e.g., the high temperatures degrade the SMA properties embedded in the SMA materials during training). Thus, producing SMA powders using hydriding and dehydriding processes according to embodiments may result in improved SMA materials, such as SMA powders.

SMA powders produced according to method 200 may be utilized in additive manufacturing processes to embed sensors in articles of manufacture. For example, the dehydrided SMA powder, when incorporated into at least the portion of an article of manufacture, may form a sensor adapted to indicate a characteristic of an environmental stress acting on at least the portion of the article of manufacture, such as an external environmental stress that may damage at least the portion of the article of manufacture, or a characteristic of an environmental stress local to at least the portion of the article of manufacture, such as a temperature of the sensor's ambient environment. Such sensors may enable detection of damage to at least the portion of the article of manufacture even when the damage is not visible to the human eye, which may simplify detection, repair, and/or replacement of the damaged component. Additionally, such sensors may enable detection of environmental conditions, such as heat, in the area proximate to the sensor. Exemplary articles of manufacture where such sensors may be desirable include structural components where structural fatigue due to mechanical loading may be difficult to detect, such as a frame or other component of automobile, an aircraft, or a spacecraft, a hull or exterior surface of a ship or a submarine, a crane arm or component, turbine components, engine components, military vehicles, aircraft, watercraft and/or equipment (e.g., housings to store chemical or biological weapons, weapon components, and the like). Sensors formed using SMA powders manufactured according to embodiments of the present disclosure may enable detection of material stress, fatigue and other types of damage (e.g., damage caused by environmental factors) that may be difficult to detect with the visual inspection, thereby simplifying detection of components that need repairs, which may allow the repairs to be performed in a more timely manner and improve the safety of the items the sensors are integrated with. As an example, a sensor may be integrated within a mobile device, such as a smartphone or other handheld device, which is configured to detect damage caused by dropping of the mobile device. Typically, users of mobile devices assume that as long as the screen does not break when the mobile device is dropped, the phone is fine. However, the user is unable to detect damage to battery cooling equipment and other internal components of the mobile device simply by looking at the exterior of the mobile device. By embedding a sensor in the mobile to detect such damage, the user may be alerted to potentially dangerous conditions of the mobile device (e.g., fire risk associated with the battery due to damage to the battery cooling components), thereby increasing the safety of such devices. Additionally, SMA powders formed according to embodiments may be utilized to form SMA foams suitable for biomedical uses, such as bone implants and other medical devices, such as a device that includes a sensor that detects when a person is overheating (e.g., the sensor undergoes a transformation when exposed to a particular temperature). In an embodiment, the particular composition of the metal object utilized may be selected based on a desired use of the SMA powder. For example, small changes in the alloy composition may result in different sensing capabilities and/or transformation triggers (e.g., what causes the sensor to indicate a particular state of stress or environmental condition).

Figure 3:
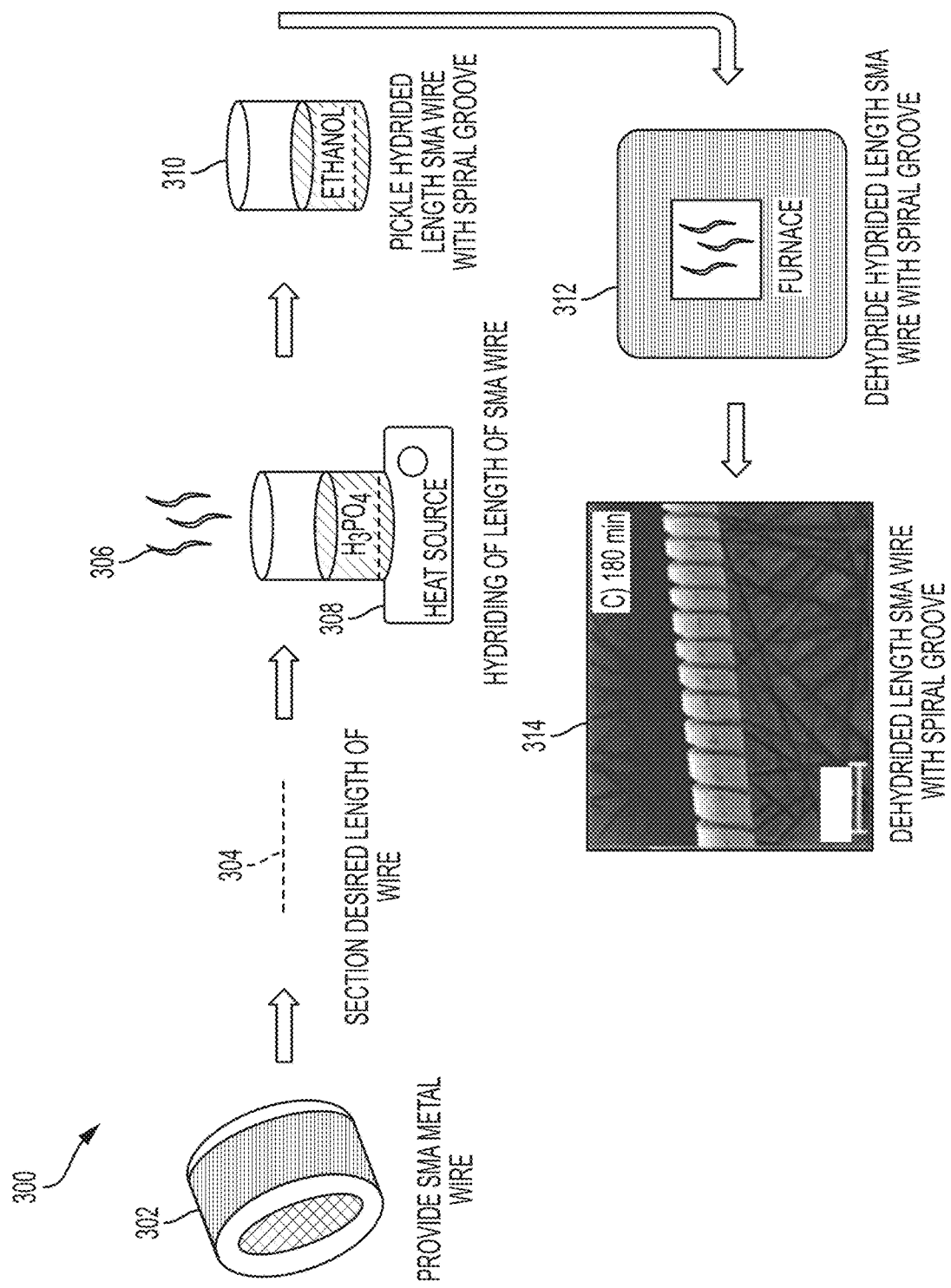
FIG. 3 is a diagram illustrating an exemplary method for producing an SMA spring and/or an SMA actuator by hydriding a metal object according to an embodiment of the present disclosure.

Referring to FIG. 3, an exemplary method for producing an SMA spring and/or an SMA actuator by hydriding a metal object according to an embodiment of the present disclosure is shown as method 300. As described in more detail below, method 300 may be utilized to produce SMA wires comprising a spiral groove which may be utilized for various purposes, such as to serve as a spring and/or an actuator. At 302, method 300 includes providing a metal object. In an embodiment, the metal object may be an SMA metal object. For example, the metal object may be a length of SMA wire (e.g., a length of wire comprising a nickel-titanium (NiTi) alloy, such as a length of martensitic $Ni_{49.5}Ti_{50.5}$ SMA wire, or another type of SMA) or a length of magnetic SMA wire (e.g., a length of magnetic SMA wire comprising a nickel-manganese-gallium alloy, such as a length of $Ni_2MnGa$ magnetic SMA wire).

At 304, method 300 includes sectioning a desired dimension of the metal object. In an embodiment, sectioning the desired dimension of the metal object may include cutting a length of SMA wire or a length of magnetic SMA wire. In an embodiment, the desired dimension of the metal object may be dependent upon the particular application for which the metal object is to be used. For example, when the metal object is an SMA or magnetic SMA wire configured to operate as a spring or actuator, the metal object (e.g., the wire) may be sectioned to a desired length for the spring or actuator. In addition to determining a length for the metal object, in some embodiments, a diameter or other dimension of the metal object may be determined and/or sectioned. For example, a diameter of the spring or actuator may be determined by selecting a wire having a desired diameter. It is noted that in an embodiment, some loss may be experienced during the processing of method 300, and therefore, a wire having a larger diameter than the intended diameter of the spring and/or actuator may be selected to account for such loss. In additional or alternative embodiments, the loss may be trivial and the diameter of the wire may be selected to match the intended diameter of the spring and/or actuator.

At 306, method 300 includes hydriding the metal object for a period of time. In contrast to conventional hydriding techniques which are performed by exposing a metal to hydrogen gas at high pressures (e.g., pressures of 150 bar or greater) and high temperatures (e.g., temperatures of 550° C. or greater), the hydriding performed at 306 may be performed at low pressure and low temperatures. For example, the hydriding may be performed at a pressure that is below a threshold pressure and at temperatures that are below a threshold temperature. In an embodiment, the threshold pressure is below 150 bar and the threshold temperature is below 550° C. In an particular embodiment, the threshold pressure is below 100 bar and the threshold temperature is below 500° C. In another particular embodiment, the threshold pressure is between 1 bar and 100 bar and the threshold temperature between 40° C. and 500° C. In still another particular embodiment, the threshold pressure is approximately atmospheric pressure (e.g., 1 bar) and the threshold temperature is approximately 65° C. Performing the hydriding at a pressure that is below the threshold pressure and at a temperature that is below the threshold temperature may provide significant improvement to the safety of the hydriding process. For example, the high pressure hydrogen gas and high temperatures utilized in some conventional hydriding techniques create safety concerns (e.g., because hydrogen is highly flammable). Thus, embodiments of method 300 may provide improved safety by performing the hydriding at low pressure and low temperatures.

To facilitate the low pressure and low temperature hydriding according to embodiments, the hydriding may be performed by placing the metal object (e.g., the SMA wire or magnetic SMA wire) in a liquid solution. In an embodiment, the liquid solution may be an acid. In an embodiment, the acid may be comprised of phosphoric acid ($H_3PO_4$), another type of acid (e.g., $H_2SO_4$, $HC_2H_3O_2$, $H_3BO_3$, $HNO_3$, diluted HCl, diluted HF, etc.), or an electrochemical cell suitable for interacting with the particular SMA. In an embodiment, the hydriding, at 306, may comprise monitoring a temperature of the liquid solution, and controlling, during the hydriding, the temperature of the liquid solution during the hydriding. The temperature may be controlled to maintain the temperature of the liquid solution (e.g., the acid) within a threshold tolerance of a target hydriding temperature during the period of time. In an embodiment, the target hydriding temperature and/or the period of time that the hydriding is performed may be selected based on one or more characteristics of the metal object. For example, characteristics affecting the period of time that the hydriding is performed and/or the target hydriding temperature may include a desired width of the spiral groove to be formed on the SMA, a size of the spiral groove, and/or a size of the SMA powder, Additionally, characteristics associated with the alloy composition of the SMA may be used to determine the target hydriding temperature and duration, as well as the PH level resulting from the specific acid/electrolyte used during the hydriding. In an embodiment, the one or more characteristics of the metal object may further include transformation temperatures. For example, SMAs may be hydrided in martensite (e.g., below $M_f$, where $M_f$ is the martensite finish temperature of the SMA) and then heated (e.g., during the dehydriding) to austenite (e.g., above $A_f$, where $A_f$ is the austenite finish temperature of the SMA) to induce phase transformation and spiral cracking of the SMA. The duration of time may be dependent upon how fast the hydriding occurs, where higher temperatures result in faster hydriding (and mass loss) and thus, the hydriding may be performed for a shorter duration at those higher temperatures. In an embodiment, the controlling may be performed by controlling a heat source 308 that may be used to maintain the liquid solution at the target hydriding temperature for the period of time. In an embodiment, one or more sensors may be utilized to monitor the temperature of the liquid solution during the hydriding, and information obtained from the one or more sensors may be utilized to control operation of the heat source 308 to maintain the liquid solution at the target hydriding temperature for the period of time. During the hydriding, at 306, hydrogen in the liquid solution diffuses into the alloy as a solute. Eventually it reaches the solubility limit and starts to form hydrides. Since the concentration of hydrogen is highest at the surface, the formation of hydrides initiates at the surface. As more hydrogen diffuses with increasing time into the alloy, hydrides continue to grow into the bulk.

In an embodiment, after the hydriding is complete, method 300 may include, at 310, cleaning the metal object subsequent to the hydriding. In an embodiment, the cleaning may include pickling the metal object by placing the metal object in an ultrasonic bath subsequent to the hydriding, and then allowing the metal object to dry. In an embodiment, the ultrasonic bath may be comprised of ethanol, another type of alcohol (e.g., methanol), acetone, or another type of cleaner. At 312, method 300 includes dehydriding the hydrided metal object (e.g., the hydrided length of SMA or magnetic SMA wire). In an embodiment, the dehydriding, at 312, may be performed by heating the hydrided metal object in a vacuum furnace. In an embodiment, the hydrided metal object may be heated in the vacuum furnace under an Argon environment, which may prevent the metal object from undergoing chemical reactions as a result of the heating. The dehydriding (e.g., the heating of the hydrided metal object in the vacuum furnace) may be performed for a period of time (e.g., a dehydriding time). The dehydriding may burn off any hydrogen present and return the metal object to its original state (e.g., all hydrides that formed on the metal object during the hydriding may be removed and the metal object may be returned to substantially the same alloy composition it had prior to the hydriding). In an embodiment, the dehydriding may be performed for a period of time. In some embodiments, the period of time for the dehydriding may be between 5 minutes and 72 hours, depending on a temperature used for the dehydriding. In an embodiment, the period of time that the dehydriding is performed may be approximately one hour. In an embodiment, the dehydriding may include heating the metal object at a temperature of approximately 700° C. In some embodiments, the dehydriding may be performed at a temperature between 650° C. and 1100° C. In an embodiment, the temperature used for the dehydriding may be determined based on a precipitation and melting point of the SMA. When selecting or determining the dehydriding temperature, the temperature should be selected/determined as a temperature that is high enough to homogenize/solutionize the structure of the SMA to binary NiTi (or another structural form depending on the particular alloy composition of the SMA). For example, the temperature used for the dehydriding may be determined as a temperature that is above the precipitation and below the melting point for the SMA. If the selected/determined temperature is too low, precipitation of $Ti_2Ni$ or $Ni_4Ti_3$ will occur depending upon the percentage of Ni in the alloy, for example. At lower temperatures it may take a longer amount time for homogenization and diffusion/removal of the hydrogen, and the dehydriding may need to be performed for a longer period of time. Thus, a relationship between the dehydriding time and the target dehydriding temperature may be expressed as: as the dehydriding temperature increases to within a threshold tolerance (e.g., the melting point) the dehydriding time decreases.

As a result of the dehydriding, at 312, a dehydrided metal object may be produced, at 314. In an embodiment, the dehydrided metal object may possess the same or substantially the same SMA properties as the metal object prior to subjecting the metal object to the processes performed by method 300. Thus, for example, dehydrided SMA and magnetic SMA materials produced according to embodiments may exhibit SMA properties that more closely match the properties of the SMA materials prior to performing method 300 because the methods of embodiments are performed at low temperatures and pressures. In contrast, hydriding and dehydriding techniques that utilize high pressure and temperatures during the hydriding process may lose some of their SMA properties or experience degradation of their SMA properties due to the high temperatures utilized during the hydriding (e.g., the high temperatures degrade the SMA properties embedded in the SMA materials during training). Thus, hydriding and dehydriding processes according to embodiments may result in improved SMA materials, such as powders, springs, and/or actuators.

During development of the hydriding processes of embodiments, it was discovered, unexpectedly, that hydriding according to the techniques illustrated in FIGS. 1-3 results in the formation of a spiral groove longitudinally along the exterior of metal wire. For example, a spiral groove can be seen in the dehydrided SMA wire illustrated at 314 of FIG. 314. According to embodiments, the spiral groove along the length of the metal may be formed during the hydriding (e.g., step 106 of FIG. 1, step 206 of FIG. 2, and/or step 306 of FIG. 3) of the metal wire using the acid. The spiral groove may be formed during the hydriding as the result of a transformation of at least a portion of the metal object, where the transformation is caused by a volume expansion of the wire during the hydriding. In embodiments, volume expansion may be based on the phase transformation (e.g., the amount of martensite that transforms). It has been observed that the spiral groove initiates at a particular location along the wire and travels in a step-wise manner along the length of the wire, increasing in depth and width as the hydriding time increases. Thus, for short hydriding times the spiral groove may be faint or barely visible, and may become more visible and/or apparent with longer hydriding times. Experiments have shown that wires respond to stress caused by mechanical loading in a manner that is similar to the response exhibited by metal ribbons and plates. Thus, it is expected that subjecting metal ribbons and plates to hydriding and dehydriding processes according to embodiments would result in grooves being formed on the ribbons and plates formed of similar SMA compositions, however, the grooves may have different geometries than the grooves formed on an SMA wire (e.g., due to the different geometry of a plate or ribbon relative to a wire). For example, on plate the groove may form linearly in a particular direction and then wrap around the plate upon reaching the edge.

Figure 4:
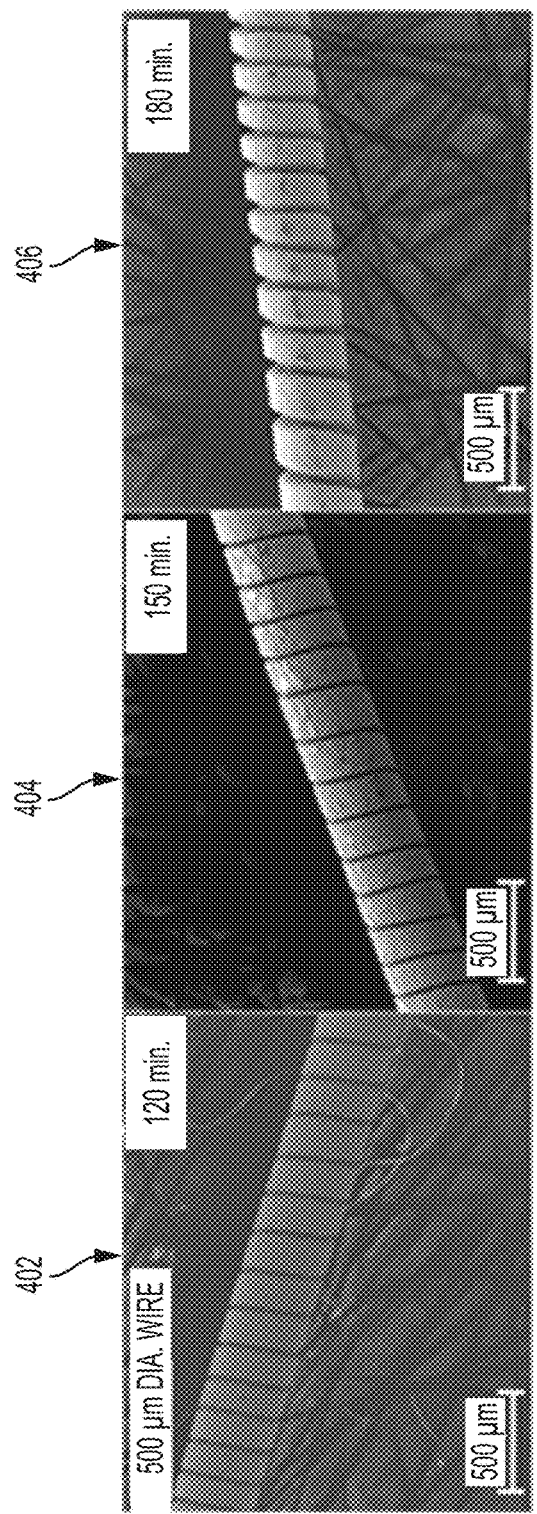
FIG. 4 shows various images illustrating spiral grooves formed on a 500 μm NiTi SMA wire.

In an embodiment, a depth of the spiral groove and/or a width of the spiral groove may be controlled by controlling the period of time of the hydriding. It has been observed that deeper spiral grooves may be achieved by utilizing longer hydriding times. For example, and referring to FIG. 4, various images illustrating spiral grooves formed on a 500 μm NiTi wire are shown. As shown in FIG. 4, spirals formed on three different 500 μm NiTi wire samples are shown, where each of the three different wire samples were hydrided for a different length of time. For example, the image 402 illustrates a spiral groove that resulted from hydriding a 500 μm NiTi wire for 120 minutes, the image 404 illustrates a spiral groove that resulted from hydriding a 500 μm NiTi wire for 150 minutes, and the image 406 illustrates a spiral groove that resulted from hydriding a 500 μm NiTi wire for 180 minutes. As can be appreciated from the images 402-406 of FIG. 4, the depth of the spiral groove increases as the hydriding time increases. Further, it is noted that the width of the spiral groove increases as the hydriding time increases. The SMA wires having the spiral groove formed thereon may be utilized as springs and/or actuators.

Additional aspects of embodiments for producing SMA materials according to embodiments of the present disclosure are provided below. It is noted that some of the information provided below represents information and observations that were obtained during the development of the various methods described above with reference to FIGS. 1-3. During the development of the embodiments of the present disclosure, as-drawn martensitic $Ni_{49.5}Ti_{50.5}$ SMA wires having diameters of 150 μm, 300 μm, and 500

µm were examined. Initially, Differential Scanning calorimeter (DSC) measurements were performed to determine phase transformation temperatures for NiTi and hydrogen-based phases, according to ASTM F2004 for NiTi SMAs. For typical NiTi SMAs, two distinct effects can be identified: an endothermic peak corresponding to the formation of the austenitic phase ($A_s$, $A_p$, $A_f$) and the positive exothermic peak corresponding to the formation of the martensitic phase ($M_s$, $M_p$, $M_f$). $A_s$, $A_p$, and $A_f$ correspond to the austenitic phase transformation start temperature, the austenitic phase transformation maximum temperature, and the austenitic phase transformation finish temperature, respectively, and the $M_s$, $M_p$, and $M_f$ correspond to the martensitic phase transformation start temperature, the martensitic phase transformation maximum temperature, and the martensitic phase transformation finish temperature, respectively. The samples were prepared by sectioning small pieces of the wire specimens, each weighing sample between 25 to 45 mg. The samples were heated from −150° C. to 500° C. (in order to capture higher temperature phase changes due to the presence of hydrogen) at a rate of 10° C. per minute for three complete heating-cooling-heating cycles. Three complete cycles were chosen in order to observe the stability of the phase transformation behavior.

Testing embodiments of the present disclosure was performed by hydrogen charging (i.e. hydriding) of NiTi SMA wires from each diameter (e.g., 150 µm, 300 µm, and 500 µm) in 85% phosphoric acid ($H_3PO_4$) at a constant temperature of 65° C. for different time intervals ranging from 30 minutes to 180 minutes, with the largest diameter being charged for the longest time. Table 1, below, provides the three diameter sizes and the three time intervals for charging of each sample.

TABLE 1

|  | Time 1 (minutes) | Time 2 (minutes) | Time 3 (minutes) |
| --- | --- | --- | --- |
| 150 µm | 30 | 60 | 90 |
| 300 µm | 90 | 105 | 120 |
| 500 µm | 120 | 150 | 180 |

The charging times were selected based on preliminary charging trials of the NiTi wires. The hydriding was performed using the low pressure hydriding/dehydriding methods described above with reference to FIGS. 1-3.

In an embodiment, the temperature of the acid may be chosen based on the austenite finish temperature. For example, when the NiTi wire has an austenite finish temperature of 50° C., the hydriding may performed in an acid having a temperature of approximately 65° C., which is being 15° C. above the austenite finish temperature. Choosing a hydriding temperature that is above the austenite finish temperature may enhance the charging process and allow the material to be austenitic during hydrogen charging. During the charging (e.g., during the hydriding), the temperature of the acid may be monitored according to a desired monitoring period (e.g., every 15, every 20 minutes, etc.) to ensure consistent heating through the specific time interval of the hydriding. Once the hydriding is completed, the specimens may be removed from the acid and placed into an ethanol ultrasonic bath for approximately five minutes. It is noted that use of an ethanol ultrasonic bath is provided for purposes of illustrating a particular technique for processing the specimens upon removal from the acid, rather than by way of limitation, and other techniques for preparing the specimens for further processing upon removal from the acid may be used in some embodiments. After the specimens are removed from the ethanol ultrasonic bath, the specimens may be allowed to dry.

Figure 5:
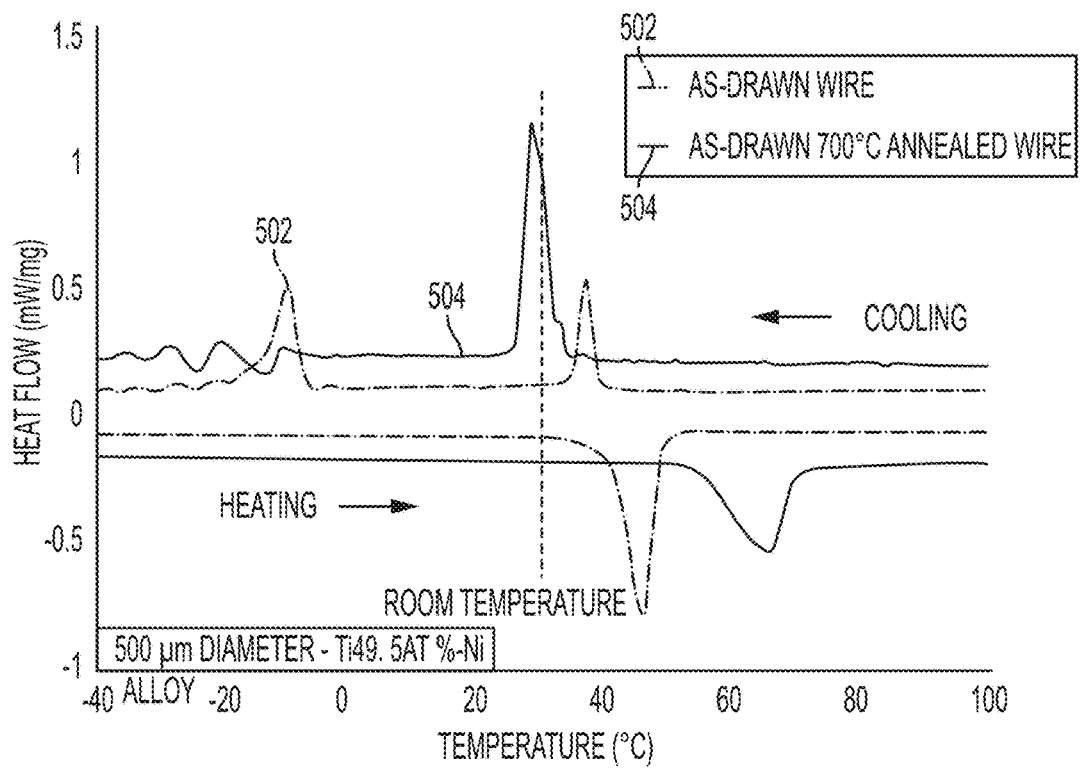
FIG. 5 is a diagram illustrating aspects of a 500 μm diameter NiTi SMA wire.

FIG. 5 illustrates aspects of a 500 µm diameter NiTi SMA wire. In FIG. 5, 502 represents the DSC curve observed for an as-drawn 500 µm diameter NiTi SMA wire (e.g., before processing according to embodiments herein), and 504 represents the DSC curve for an as-drawn 500 µm diameter NiTi SMA wire annealed at approximately 700° C. (e.g., after undergoing dehydriding processing according to FIGS. 1 and 3). The curves shown in FIG. 5 illustrate aspects of the transition temperatures for different SMA wires.

Figure 6:
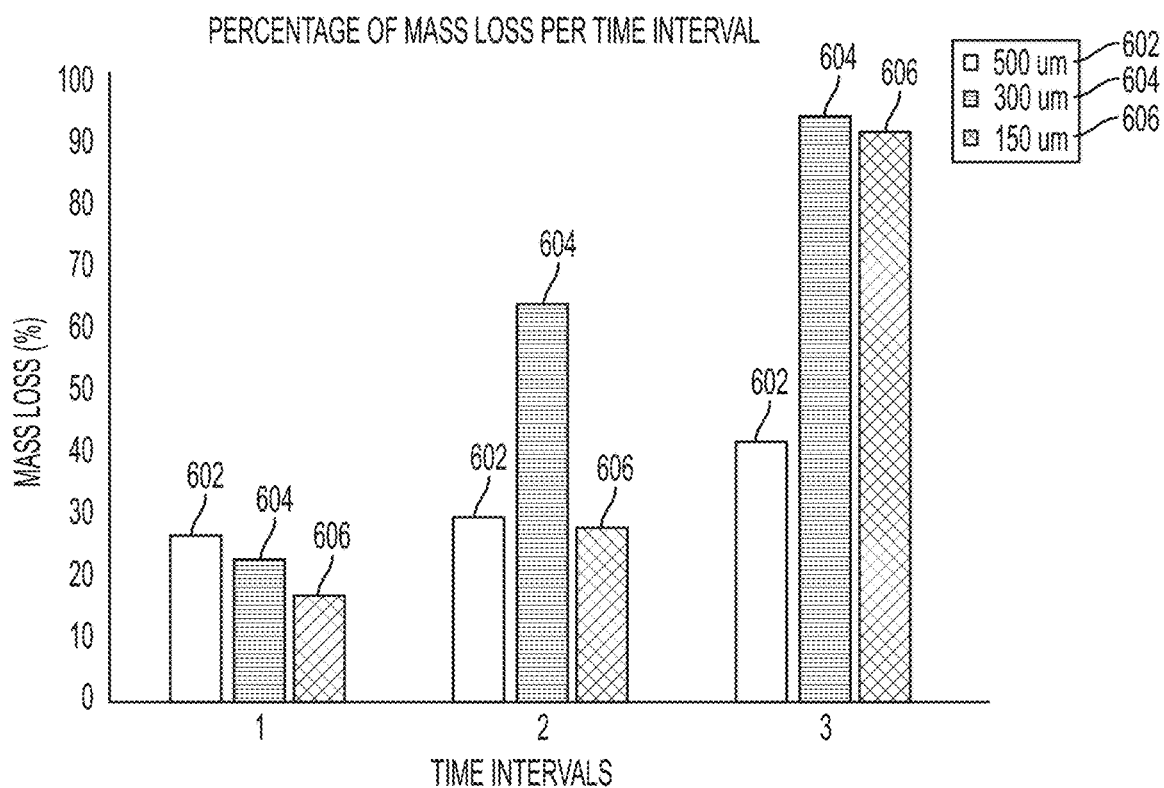
FIG. 6 is a bar graph illustrating aspects relating to the percentage mass loss at the three different time intervals for different wire diameters.

As explained above, during the hydriding processes according to embodiments, the SMA wire may experience a loss in mass (e.g., due to the formation of the spiral grove during the hydriding). FIG. 6 is a bar graph illustrating aspects relating to the percentage mass loss at the three different time intervals for different wire diameters. In an embodiment, the different timer intervals may correspond to the time intervals shown in Table 1, above. For example, the time interval (1) of FIG. 6 (left) may be 30 minutes (150 µm diameter wire), 90 minutes (300 µm diameter wire), and 120 minutes (500 µm diameter wire), the time interval (2) of FIG. 6 (middle) may be 60 minutes (150 µm diameter wire), 105 minutes (300 µm diameter wire), and 120 minutes (500 µm diameter wire), and the time interval (3) of FIG. 6 (right) may be 90 minutes (150 µm diameter wire), 120 minutes (300 µm diameter wire), and 180 minutes (500 µm diameter wire).

Figure 7:
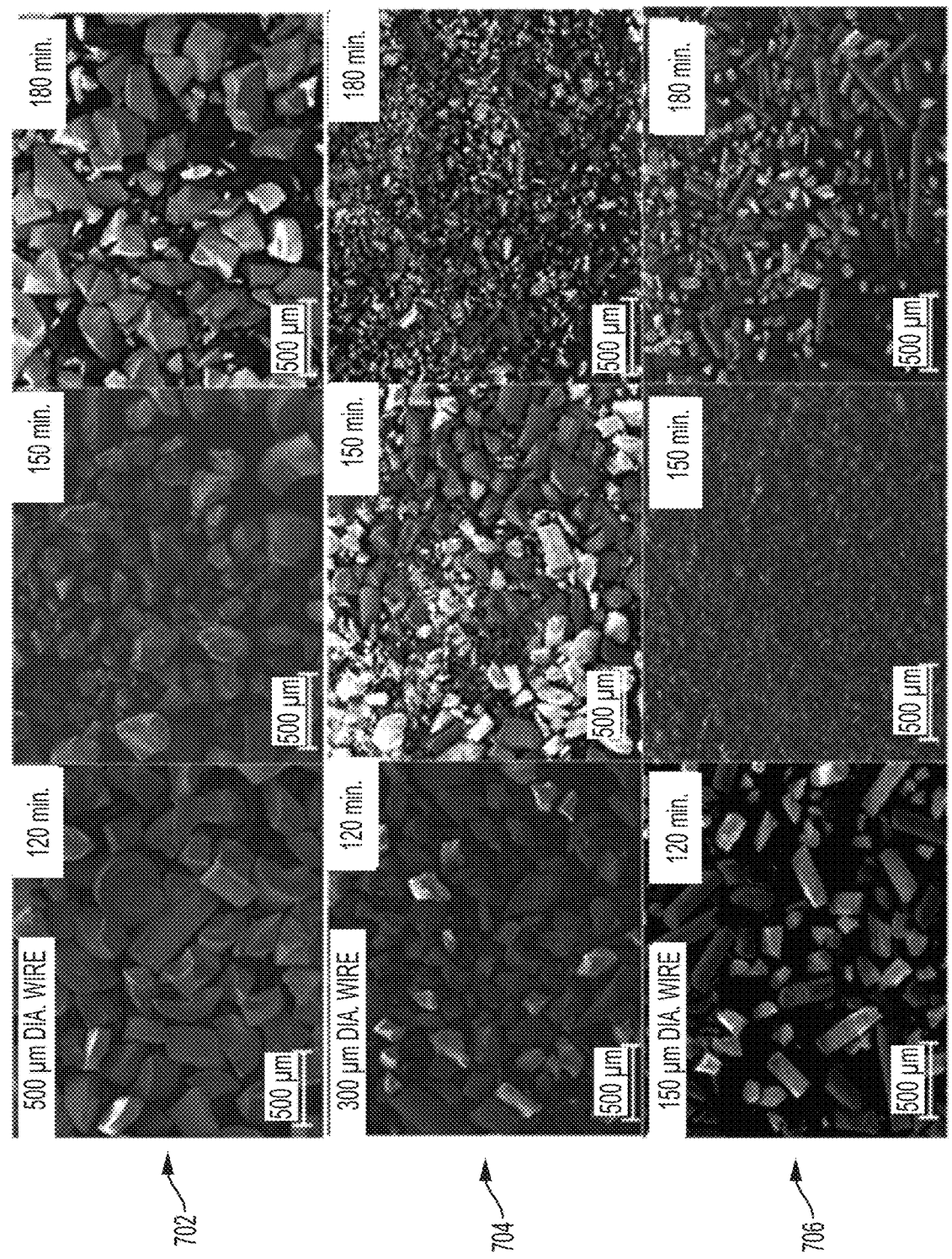
FIG. 7 is a diagram showing various images of powders produced by hydriding SMA wires according to embodiments.
Figure 8:
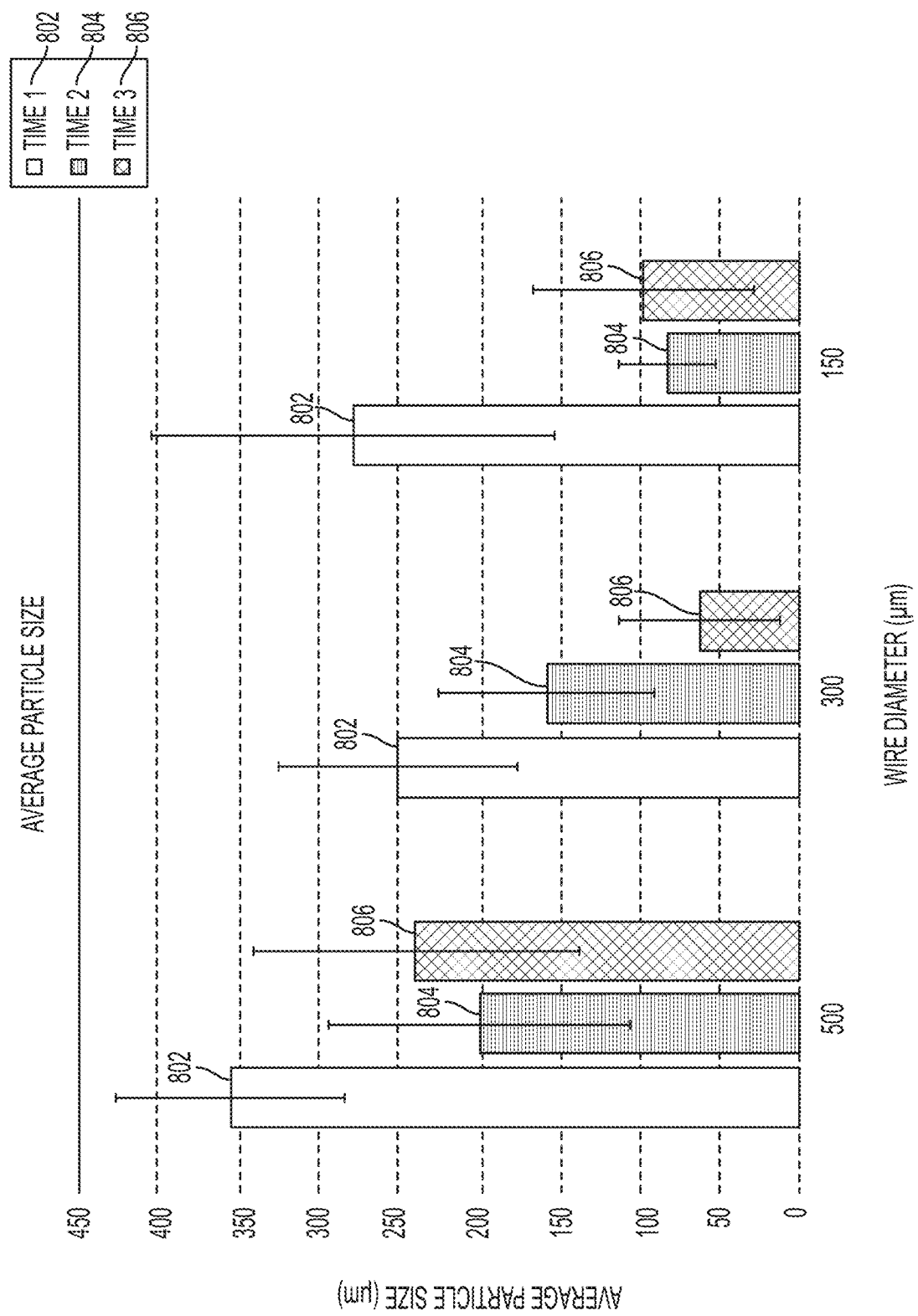
FIG. 8 is a diagram illustrating average particle sizes for powders generated from different thicknesses of SMA wire using different charging times.

FIG. 7 shows various images of powders produced by hydriding SMA wires according to embodiments. In an embodiment, the powders illustrated in FIG. 7 may be produced using method 100 of FIG. 1 and/or method 200 of FIG. 1. At row 702 particles for powders produced from a 500 µm diameter wire are illustrated, at row 704 particles for powders produced from a 300 µm diameter wire are illustrated, and at row 706 particles for powders produced from a 150 µm diameter wire are illustrated. As shown in FIG. 7, the powders show a unique circular pattern corresponding to an outer hydrided layer. This is further illustrated with reference to FIG. 9. In an embodiment, a thickness of the hydrided layer may increase with the duration of the hydriding. Thus, controlling the duration of the hydriding may enable the thickness of the hydride layer to be controlled. Further, as explained above, embodiments may enable the particle size to be controlled. For example, FIG. 8 illustrates average particle sizes for powders generated from different thicknesses of SMA wire using different charging times. Average powder particle sizes produced using a 500 µm diameter wire (left), 300 µm diameter wire (middle), and a 500 µm diameter wire (right) are shown, where 802 corresponds to the first hydriding interval, 804 corresponds to the second hydriding time interval, and 806 corresponds to the third hydriding time interval described above for each diameter of wire with respect to FIG. 6. It is noted that in some embodiments, particle size may also be controlled, at least in part by using different crushing techniques to form the powders from the hydrided SMA wires. For example, a mortar and pestle may enable powders to be formed with relatively uniform sizes, but using a ball milling technique may result in finer powders and an even more uniform particle size.

Table 2, below, illustrates an estimated diffusion rate for the hydriding according to embodiments at 120 minutes 902, 150 minutes 904, and 180 minutes 906, respectively.

TABLE 2

| Hydrogen Charging Time (min) | Average thickness of the Hydride Layer (μm) | Diffusion Rate (μm/min) |
|---|---|---|
| 120 | 65.6± | 0.55± |
| 150 | 79.0± | 0.53± |
| 180 | 96.1± | 0.53± |

Figure 9:
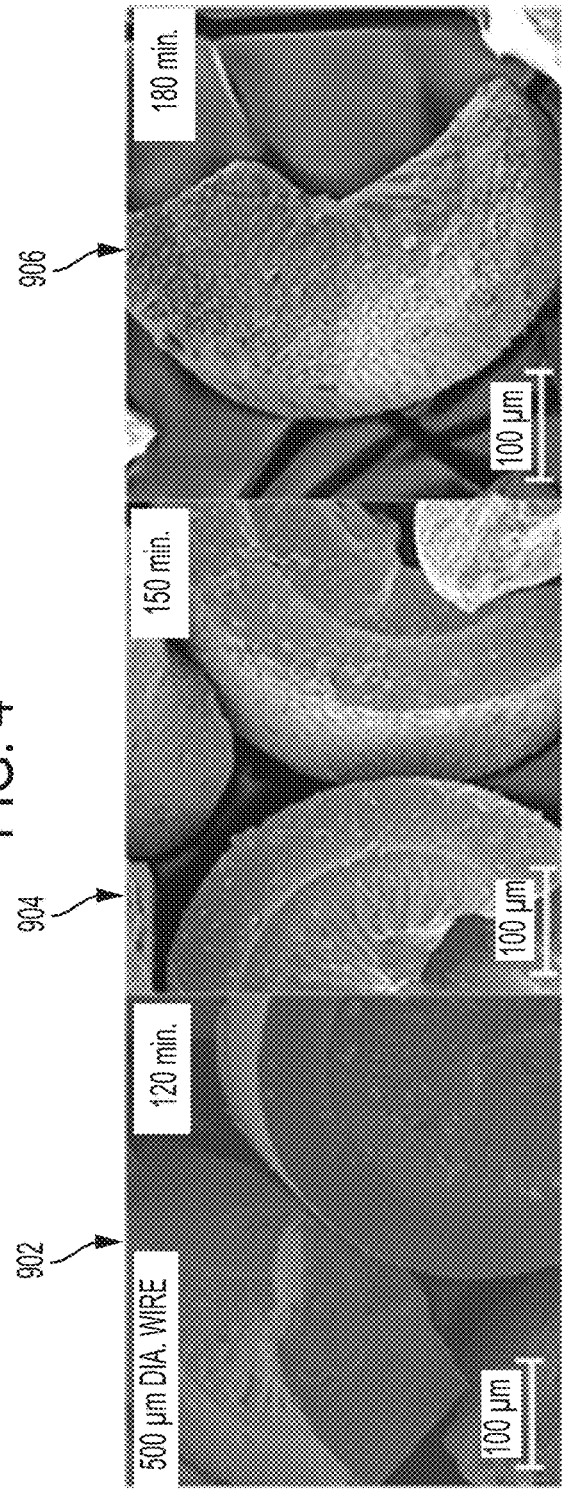
FIG. 9 is a diagram showing various aspects of powders produced by hydriding SMA wires according to embodiments.

In an embodiment, the values illustrated in Table 2 above may be determined based on the SEM images, such as the images illustrated in FIG. 9, and the diffusion rate of hydrogen in the NiTi SMA wires during the hydrogen may be calculated by measuring the thickness of the hydride layer for each image. The thickness was then divided by the hydrogen charging time, and an average diffusion rate was calculated from five thickness/time measurements for each hydrogen charging time. Table 3 shows the diffusion rate of hydrogen in the NiTi in μm/min.

Figure 10:
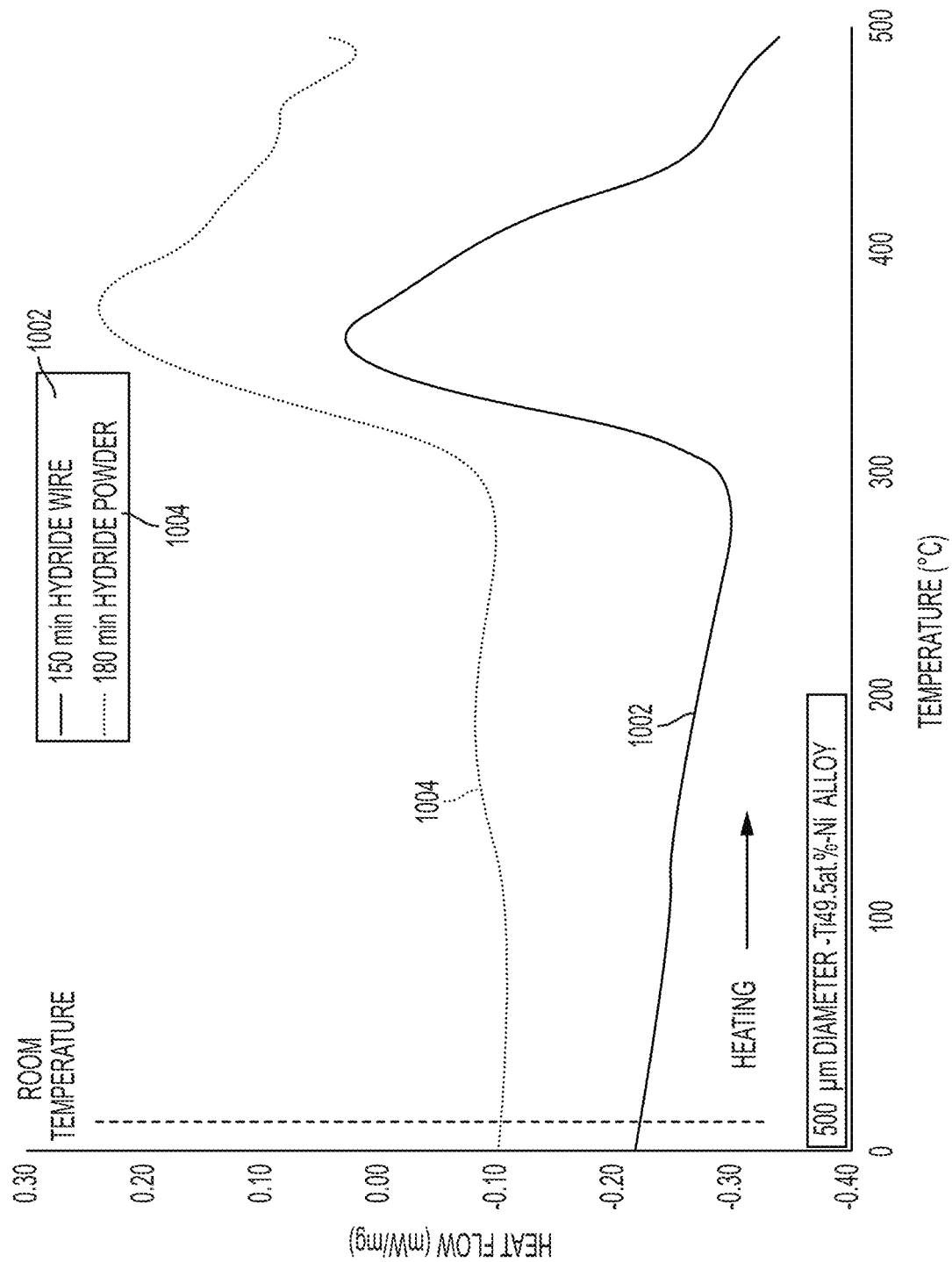
FIG. 10 is a diagram illustrating DSC curves for 500 μm diameter wire samples that were hydrided according to embodiments.
Figure 11:
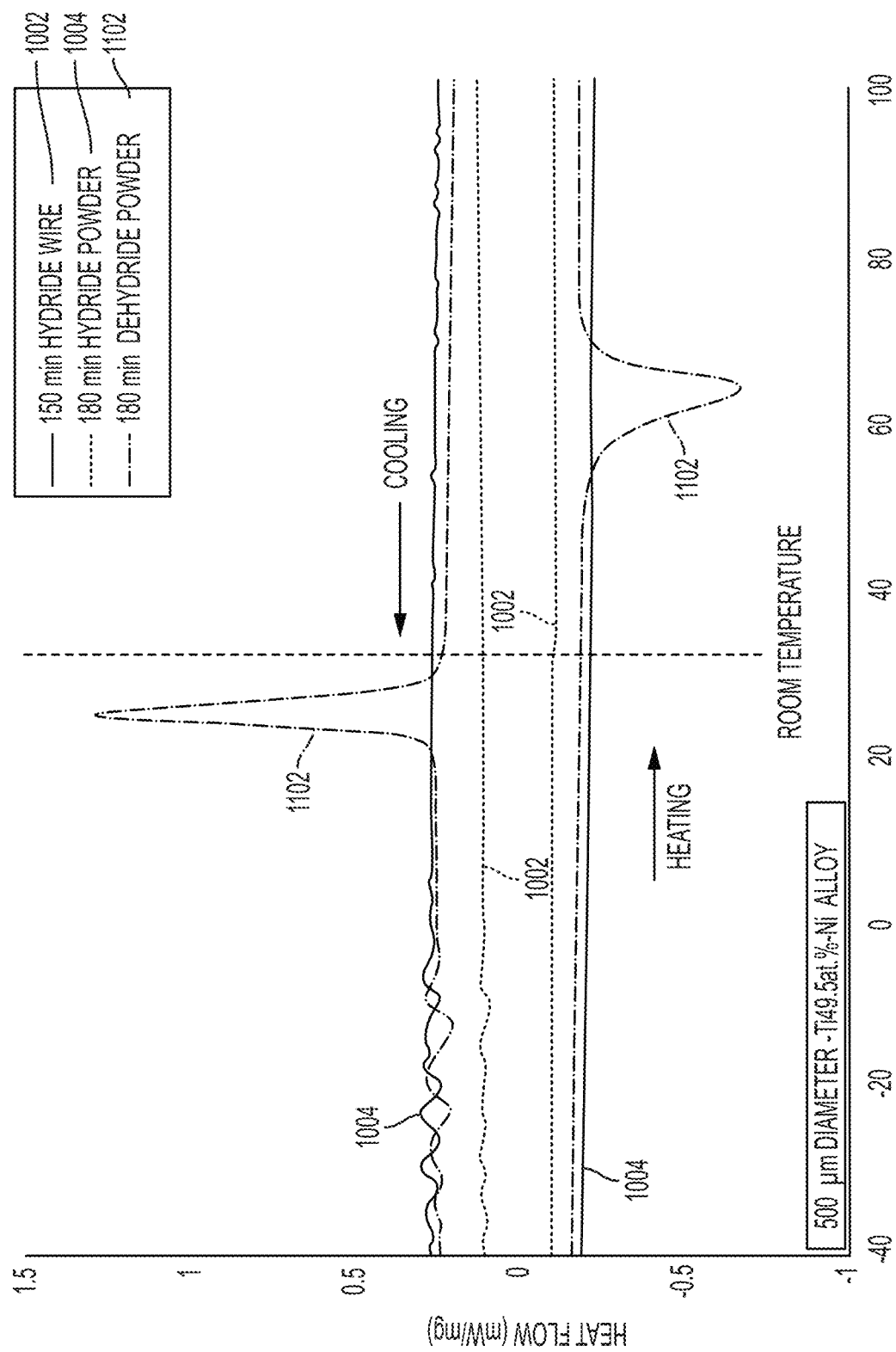
FIG. 11 is a diagram illustrating DSC curves illustrating that dehydrided SMA wires according to embodiments retain their SMA properties.

Referring to FIG. 10, a diagram illustrating DSC curves for 500 μm diameter wire samples that were hydrided according to embodiments is shown. In an embodiment, the curve 1002 may correspond to sample in a hydrided wire state (e.g., a wire hydrided according to the embodiment of FIG. 3) and the curve 1004 may correspond to sample in a hydrided powder state (e.g., a hydrided SMA powder according to the embodiment of FIG. 3). Referring to FIG. 11, a diagram illustrating DSC curves illustrating that dehydrided SMA wires according to embodiments retain their SMA properties is shown. As shown in FIG. 11, the hydrided wire state 1002 of FIG. 10 and the hydrided powder state 1004 of FIG. 10 have no shape memory effect, as evidenced by the linear nature of green and orange data with no peaks. However, as illustrated at 1102, to restore the shape memory effect, the hydrided samples can be dehydrided via heat treatment, as described above with respect to FIGS. 1-3. Curve 1102 illustrates that the dehydride powder state shows full shape memory effect as noted by the austenitic peak at approximately 62° C. and the martensitic peak at approximately 20° C. Thus, embodiments of the present disclosure provide techniques for producing SMA wires and powders having desirable shape memory effect.

Figure 12:
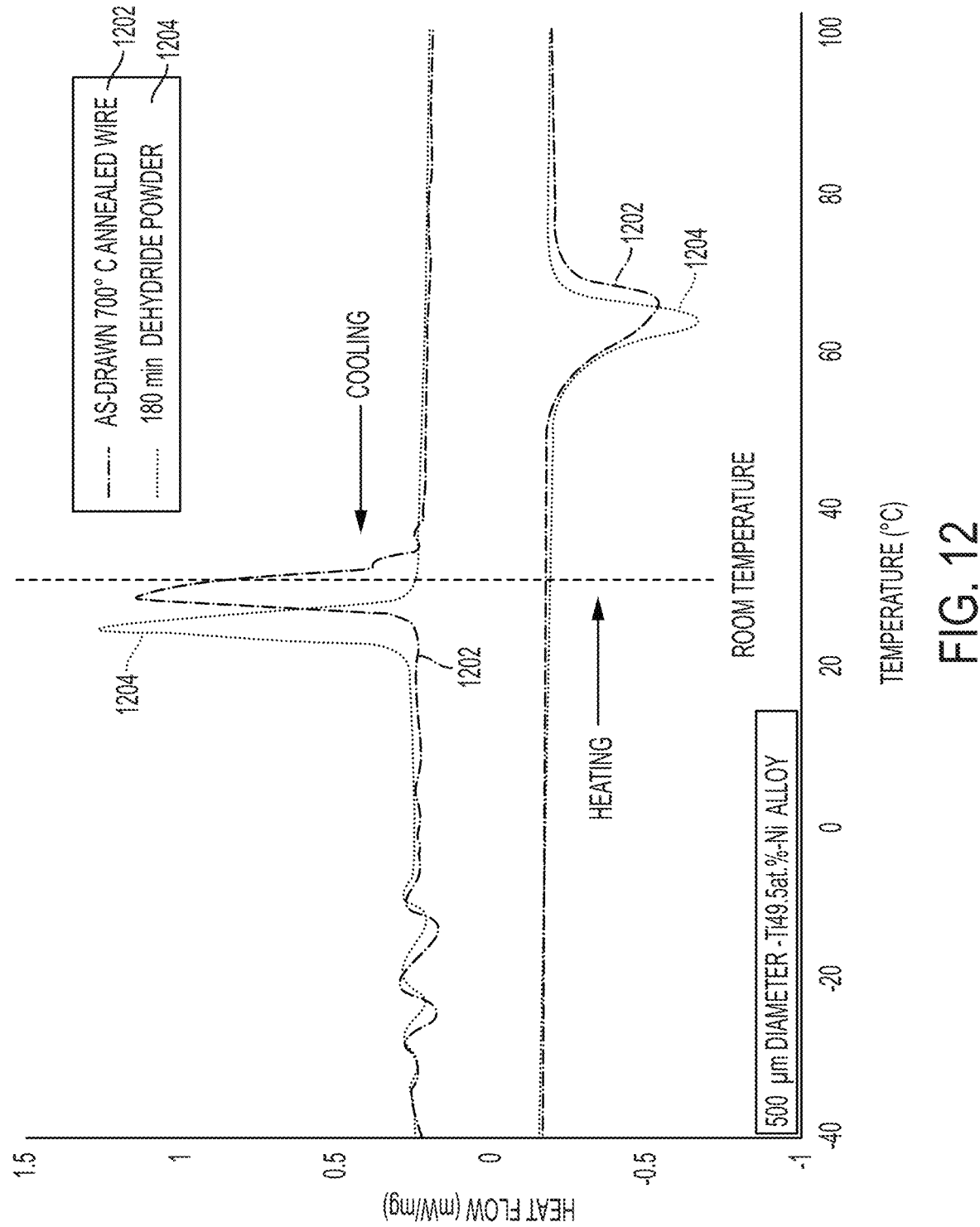
FIG. 12 a diagram illustrating DSC curves illustrating that dehydrided SMA powders according to embodiments retain their SMA properties.

Referring to FIG. 12, a diagram illustrating DSC curves illustrating that dehydrided SMA powders according to embodiments retain their SMA properties is shown. The as-drawn and annealed wire state 1202 has a desirable shape memory curve. The curve shows both an austenitic peak and martensitic peak without the presence of an R-Phase. There is a noticeable shift in the shape memory peaks as well, with the as-drawn and annealed wire state exhibiting its austenitic peak at approximately 65° C. and its martensitic peak at approximately 23° C. (right below room temperature). This shift in peaks can be attributed to the annealing process that relieved deformation within the wire after strain was created during the drawing process. The comparative shape memory effect for the 180 minute dehydride powder state is shown at 1204. As shown, the dehydrided powder state 1204 also exhibits a desirable shape memory effect similar to that of the as-drawn and annealed wire state. Both the austenitic and martensitic peaks for the two states are within approximately 5° C. of each other.

Figure 13:
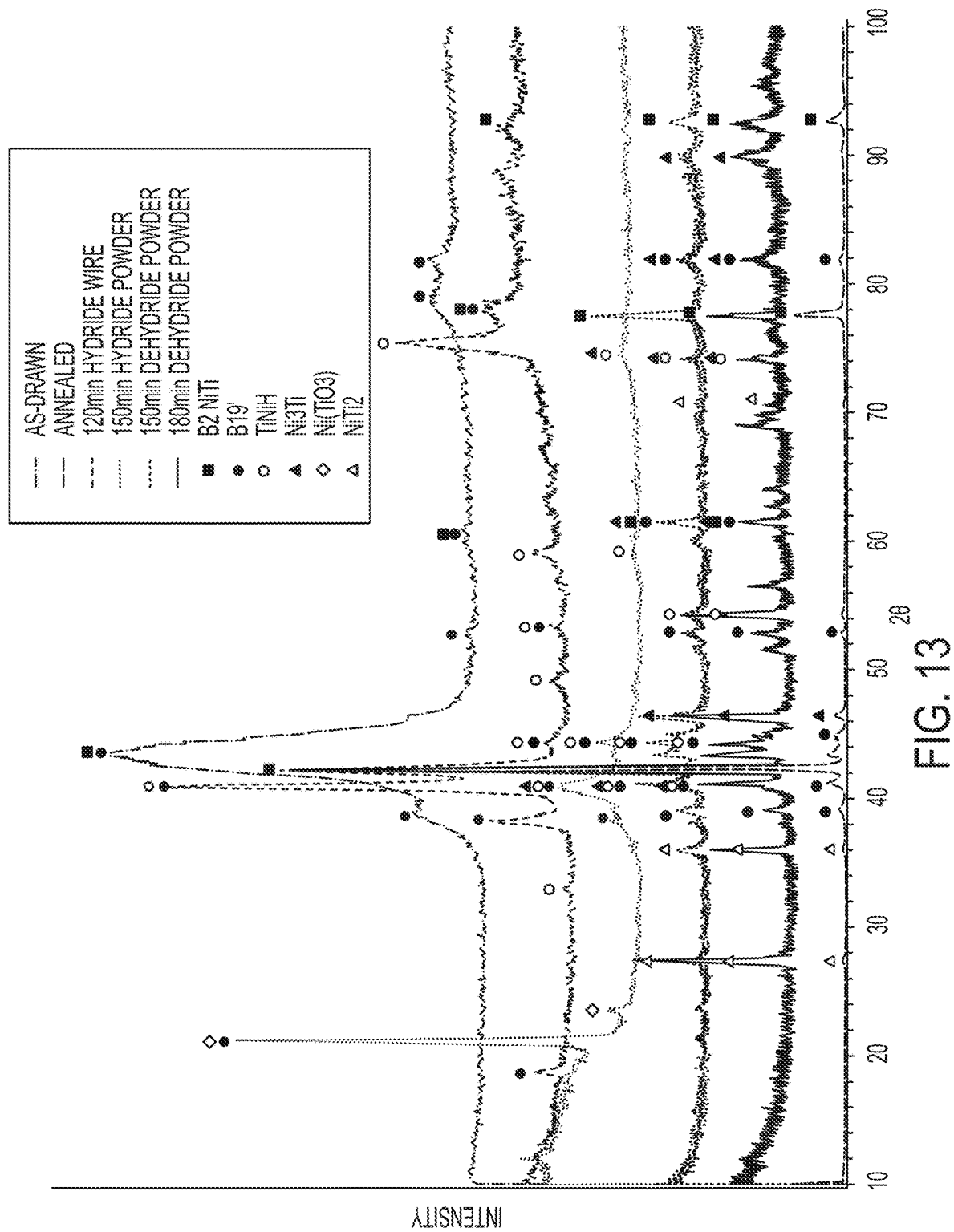
FIG. 13 is a diagram illustrating XRD peaks used to examine the composition of hydrogen charged and dehydrided samples.

Referring to FIG. 13, a diagram illustrating XRD peaks used to examine the composition of hydrogen charged and dehydrided samples is shown. In FIG. 13, a 500 μm wire was hydrogen charged, then pulverized, and the resulting wires and powders were characterized indicating the successful hydriding, dehydriding of shape memory NiTi wire and powders. During this testing, six distinct phases were detected: B2 NiTi, B19' NiTi, TiNiH, $Ni_3Ti$, $NiTi_2$ and $Ni(TiO_3)$. As shown in FIG. 13, the phase compositions involved in the hydride/dehydride processes can be seen in the change of XRD patterns of the hydrogen charged 500 μm diameter wire and resulting powders. The as-drawn wire is composed of martensitic B19' wire with peak broadening due to residual B2 NiTi. The hydrogen charged 120 minute and 150 minute samples have peaks that coincide with the formation of TiNiH, $Ni_3Ti$, $NiTi_2$ as well as a major peak split that occurs because of hydriding. The 150 minute hydride powder shows a considerable $Ni(TiO_3)$ contamination due to oxidation of the heavily hydrided powder. The 150 minute and 180 minute dehydrided powder shows precipitation of $Ni_3Ti$ phase which is more thermodynamically stable than B19' NiTi in nickel rich NiTi at 700° C. The $Ni_3Ti$ phase precipitates during the dehydriding process due to slow cooling of nickel rich areas. These nickel rich areas develop when titanium is leached from the wire during the dehydriding process in the form of $TiO_2$ [8]. There is still evidence of martensitic B19' peaks in the dehydrided samples despite the formation of $Ni_3Ti$, and $NiTi_2$. This argument is supported by the DSC measurements indicating preservation of the B19' transformation (shape memory effect) after processing. The dehydriding process is considered successful due to the reduction of the NiTiH peaks on the dehydrided sample's XRD scans.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

The invention claimed is:

1. A method comprising:
   forming a spiral groove on a metal wire, said forming comprising:
      hydriding the metal wire using an acid for a period of time to form the spiral groove along a length of the metal wire; and
      dehydriding the metal wire,
   wherein the spiral groove forms on the metal wire as a result of a transformation caused by a volume expansion of the wire during the hydriding.

2. The method of claim 1, further comprising controlling a depth of the spiral groove by controlling a duration of the period of time of the hydriding.

3. The method of claim 2, wherein the depth of the spiral groove increases as the duration of the period of time of the hydriding increases.

4. The method of claim 1, further comprising:
monitoring, during the hydriding, a temperature of the acid; and
controlling, during the hydriding, the temperature of the acid during the hydriding, wherein the controlling maintains the temperature of the acid within a threshold tolerance of a target hydriding temperature during the period of time.

5. The method of claim 1, wherein the metal wire comprises a shape memory alloy (SMA) wire.

6. The method of claim 5, further comprising incorporating the metal wire into an article of manufacture after the dehydriding.

7. The method of claim 6, wherein the metal wire is adapted to operate as an actuator once incorporated into the article of manufacture.

8. The method of claim 6, wherein the metal wire is adapted to operate as a sensor once incorporated into the article of manufacture.

9. The method of claim 1, wherein the metal wire comprises a magnetic shape memory alloy wire.

10. The method of claim 1, wherein the hydriding is performed at a pressure that is below 150 bar, and a temperature that is below 550° C.

11. The method of claim 1, wherein the hydriding is performed at a pressure of approximately 1 bar, and a temperature of approximately 65° C.

\* \* \* \* \*